United States Patent [19]

Yen

[11] Patent Number: 5,619,934
[45] Date of Patent: Apr. 15, 1997

[54] WASTE CAR DISPOSER

[76] Inventor: Chin-Ching Yen, No. 232, Sec. 2, Lu-Tsao Road, Lu-Kang, Chang-Hua Hsien, Taiwan

[21] Appl. No.: 598,542

[22] Filed: Feb. 8, 1996

[51] Int. Cl.⁶ .................................................. F23G 5/00
[52] U.S. Cl. ...................... 110/235; 100/74; 110/166; 110/248; 110/255; 266/205; 432/128; 432/153
[58] Field of Search ..................... 110/235, 236, 110/248, 250, 255, 166; 432/75, 126, 128, 137, 141, 153; 266/200, 205, 249, 255

[56] References Cited

U.S. PATENT DOCUMENTS 3,613,562 10/1971 Brewer ........................................ 100/74
4,966,547 10/1990 Okuyama et al. ........................... 432/9
5,172,849 12/1992 Barten et al. ............................... 228/18

FOREIGN PATENT DOCUMENTS 8203199 3/1984 Netherlands ........................... 110/166

Primary Examiner—Henry A. Bennett
Assistant Examiner—Pamela A. O'Connor
Attorney, Agent, or Firm—Morton J. Rosenberg; David I. Klein

[57] ABSTRACT

A waste car disposer which includes a plurality of tunnel-like furnaces connected in series and separately controlled to heat waste cars at different temperatures so that plastic, rubber, glass, lead, zinc, nickel, copper, iron and steel parts of waste cars are separately melted and respectively collected for reclamation.

1 Claim, 3 Drawing Sheets

WASTE CAR DISPOSER

BACKGROUND OF THE INVENTION

The present invention relates to waste car disposers, and relates more particularly to such a waste car disposer which uses a longitudinal series of tunnel-like furnaces connected in series and separately controlled to heat waste cars at different temperatures so as to reclaim different materials separately.

When to dispose waste cars, the engines, the tires, the chairs, the window glass, the electric wires, etc., are respective dismantled and separately collected, and then the frame body of each waste car is crushed. However, because a car generally comprises 6% of plastic and rubber content, 2.4% of glass content, 0.75% of lead content, 1.6% of zinc content, 4% of nickel content, 0.87% of copper content, and 86% of iron and steel content. It is complicated to separate these material contents from one another by labor. When the parts and frame bodies of waste cars are dismantled and crushed, a big storage space is still required to hold the dismantled and crushed parts and frame bodies of waste cars.

SUMMARY OF THE INVENTION

The present invention has been accomplished under the circumstances in view. It is the prime object of the present invention to provide a waste car disposer which can heat waste cars at different temperatures in different furnaces so as to melt different material contents for reclamation separately.

According to the preferred embodiment of the present invention, the waste car disposer comprises a plurality of tunnel-like furnaces connected in series, a plurality of heat insulative gate members respectively controlled to open/close the passage between each two adjacent furnaces, a conveyer controlled to carry waste cars through the furnaces, said conveyor having a plurality of through holes, each furnace comprising a respective heating element separately controlled to heat waste cars passing through, and a respective side-loading sliding collecting tray disposed below the conveyer for collecting melted parts of waste cars carried by the conveyer through the furnaces.

DETAILED DESCRIPTION OF THE PREFERRED EMBODIMENT

Figure 1:
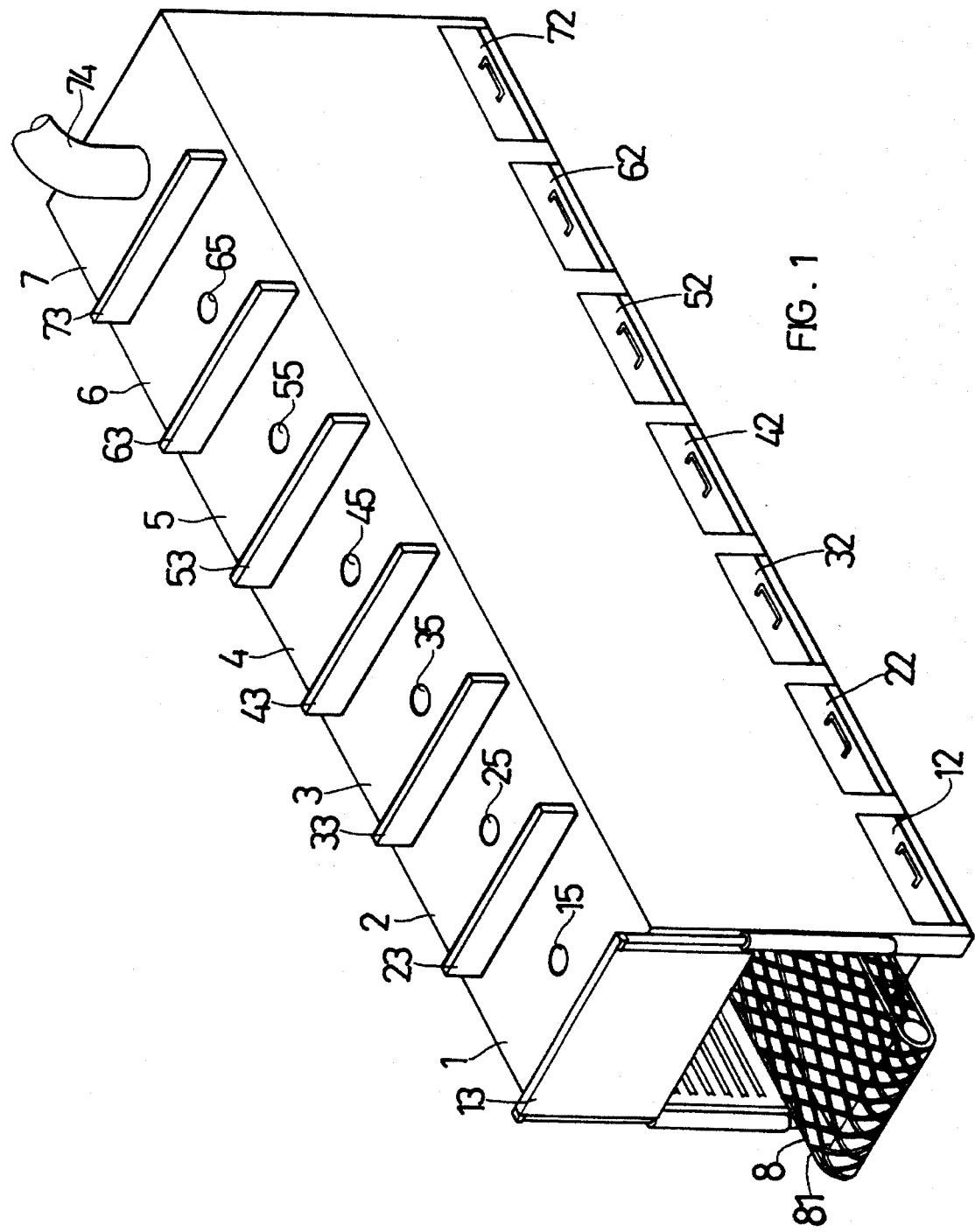
FIG. 1 is an elevational view of a waste car disposer according to the present invention.
Figure 2:
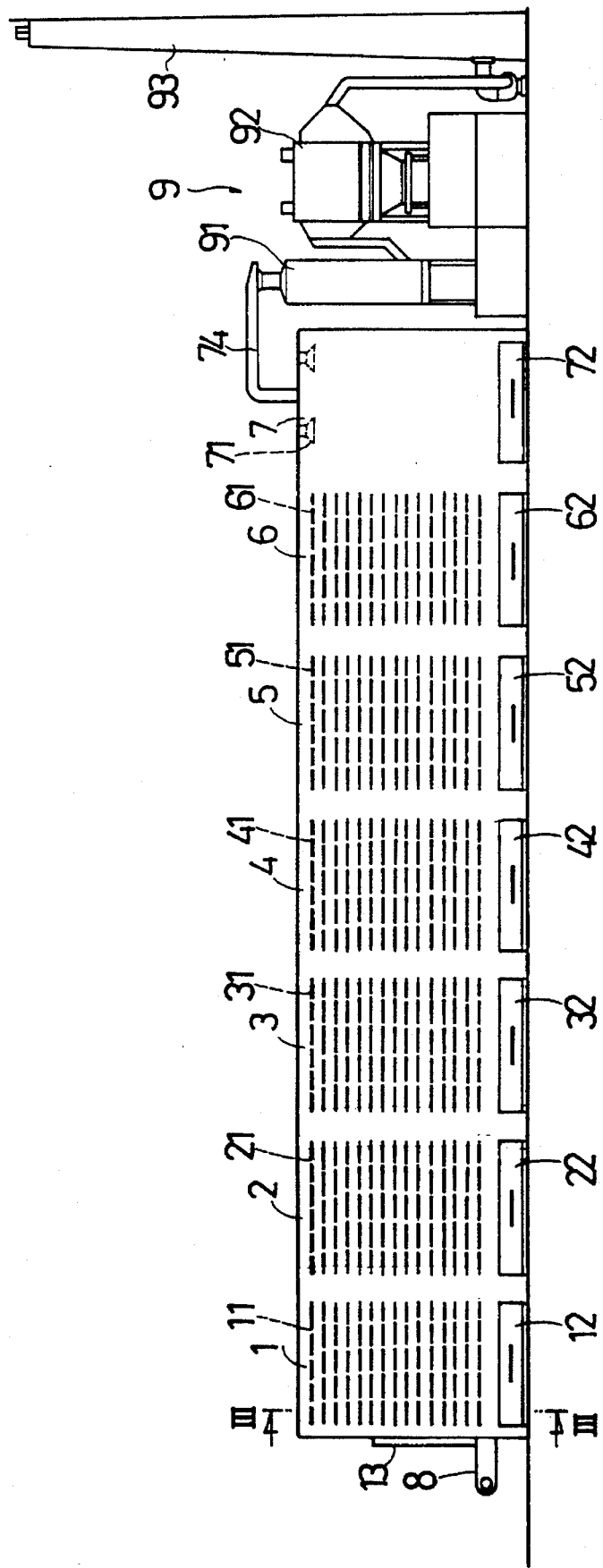
FIG. 2 is a side view in plain of the waste car disposer shown in FIG. 1.
Figure 3:
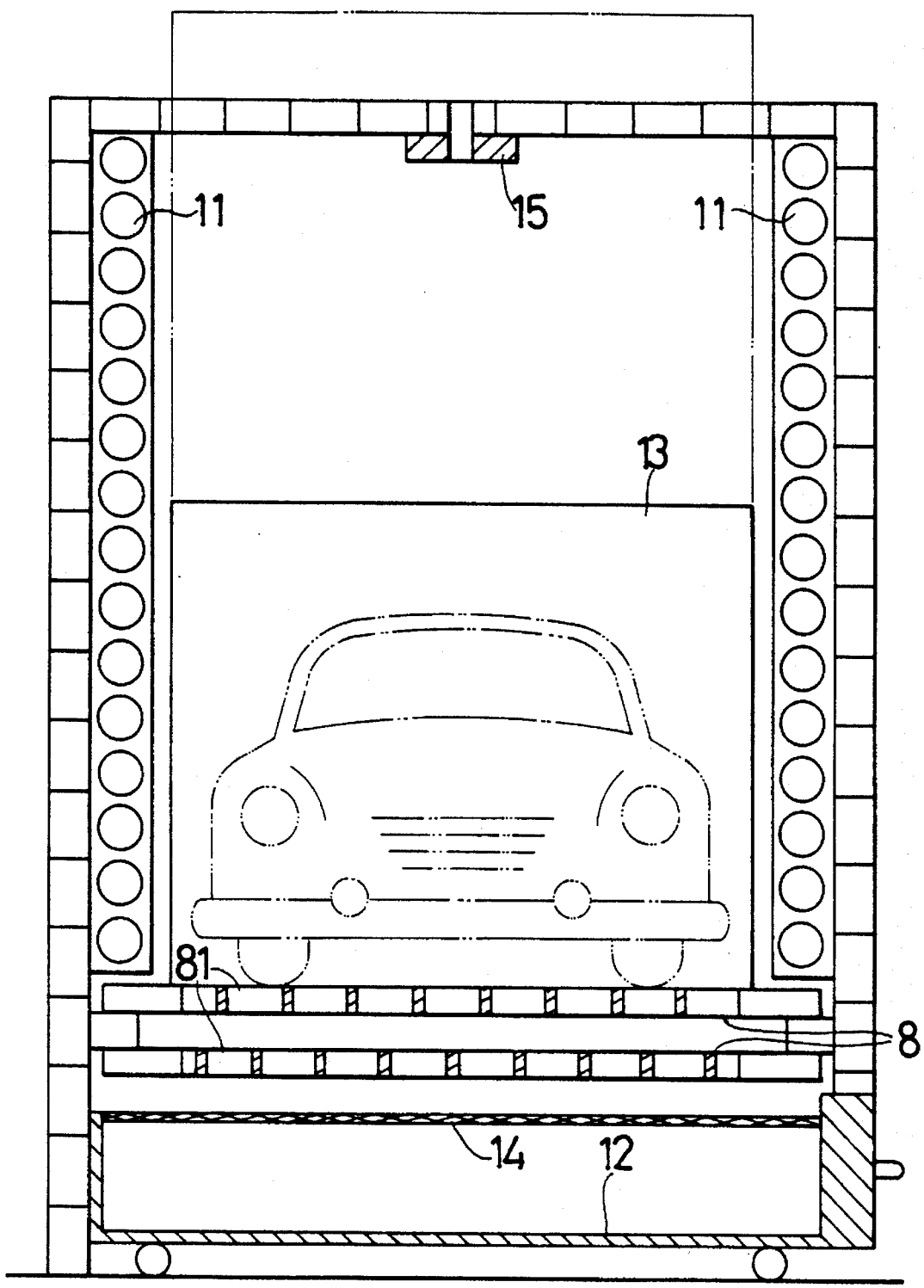
FIG. 3 is a sectional view taken along line III-III of FIG. 2.

Referring to FIGS. 1, 2, and 3, a waste car disposer in accordance with the present invention a longitudinal series of tunnel-like furnaces, namely, the first furnace 1, the second furnace 2, the third furnace 3, the fourth furnace 4, the fifth furnace 5, the six furnace 6, and the seventh furnace 7 longitudinally connected together. The seventh furnace 7 has a closed end. The furnaces have respective independent heating elements 11, 21, 31, 41, 51, 61, 71 (in which, the elements 21, 31, 41, 51, 61, 71 are illustrated as the dashed lines in FIG. 2), and respective side-loading sliding collecting trays 12, 22, 32, 42, 52, 62, 72 at the bottom. A conveyer 8 is mounted in the furnaces 1, 2, 3, 4, 5, 6, 7 and controlled to carry waste cars through each furnace. The conveyer 8 has a plurality of vertical through holes 81. Each of the side-loading sliding collecting trays 12, 22, 32, 42, 52, 62, 72 is covered with a screen 14, which collects waste parts of heated waste cars dropped through the vertical holes 81 of the conveyer 8. Heat insulative gate members 13, 23, 33, 43, 53, 63, 73 are respectively mounted in between each two adjacent furnaces and the front side of the first furnace 1 and driven by a driving mechanism, for example, hydraulic cylinders (not shown), between the close position and the open position.

The aforesaid furnaces from 1 to 6 are controlled to heat the waste car in the closed space therein by the respective electric heating elements 11, 21, 31, 41, 51, 61. The furnace temperature of the first furnace 1 is maintained within 280° C. –300° C. to melt 6% of plastic and rubber content of the waste car. The furnace temperature of the second furnace 2 is maintained within 320° C. –330° C. to melt 0.75% of lead content of the waste car. The furnace temperature of the third furnace 3 is maintained within 440° C. –450° C. to melt 1.6% of zinc content of the waste car. The furnace temperature of the fourth furnace 4 is maintained within 655° C. –665° C. to melt 4% of nickel content of the waste car. The furnace temperature of the fifth furnace 5 is maintained within 900° C. –1000° C. to melt 2.4% of glass content of the waste car. The furnace temperature of the six furnace 6 is maintained within 1000° C. –1100° C. to melt 0.87% of copper content of the waste car. While heating, nitrogen is filled into the furnaces to prevent the occurrence of a chemical reaction.

However, in order to prevent an over-pressure, pressure regulators 15, 25, 35, 45, 55, 65 are respectively installed in the furnaces from 1 to 6 to regulate the furnace pressure of each furnace within a respective predetermined value. The molten substance collected in each collecting tray of the furnace from 1 to 6 can be reclaimed.

The heating element 71 of the seventh furnace 7 is a set of fuel injectors (shown as the dashed lines in FIG. 2). Thus, the seventh furnace 7 is filled with fuel by the heating element 71 to burn and heat the residual 86% iron and steel content of the waste car at 1300° C. –1600° C. The seventh furnace 7 has an exhaust pipe 74 connected to a waste gas processing unit 9, which comprises a rinsing apparatus 91, a dust collector 92, and a chimney 93.

The aforesaid conveyer 8, heat insulative gate members 13, 23, 33, 43, 53, 63, 73, screens 14, 24, 34, 44, 54, 64, 74, and collecting trays 12, 22, 32, 42, 52, 62, 72 are respectively made from alloy steel which resists heat as high as 1200° C.

When a first waste car is carried by the conveyer 8 to the inside of the first furnace 1, the 6% of plastic and rubber content of the first waste car are melted and flow through the vertical through holes 81 of the conveyer 8 to the collecting tray 12. If any metal parts are carried with molten plastic and rubber to the collecting tray 12, they will be stopped at the respective screen 14. Therefore, when the collecting tray 12 is pulled out of the first furnace 1, the metal parts and the molten plastic and rubber can be reclaimed separately. The plastic parts of regular motor vehicles are commonly made from polypropylene. Because the molecular structure of polypropylene is different from that of polyethylene and nylon, molten polypropylene can be easily separated from the molten matter collected in the collecting tray 12.

When the plastic and rubber content of the first waste car is melted and collected, the heat insulative gate member 13 is opened, and the conveyer 8 is controlled to deliver the first waste car to the second furnace 2 for heating, permitting the 0.75% of lead content to be melted and guided to the respective collecting tray 22. When the first waste car is moved into the second furnace 2, a second waste car is simultaneously carried by the conveyer 8 to the first furnace 1 for heating.

When the lead content of the first waste car is melted and collected, the heat insulative gate member 23 is opened, and the conveyer 8 is controlled to deliver the first waste car to the third furnace 3 for heating, permitting the 1.6% of zinc content of the first waste car to be melted and guided to the respective collecting tray 32. When the first waste car is moved to the seventh furnace 7 and its 86% of iron and steel content is melted and collected in the respective collecting tray 72, the first waste car is completely melted. Furthermore, the staying time of the conveyer 8 in each furnace and its moving speed can be regulated as desired.

While only one embodiment of the present invention has been shown and described, it will be understood that various modifications and changes could be made without departing from the spirit and scope of the invention disclosed. For example, the seventh furnace can be an electric inductance furnace which melts the iron and steel content of waste cars by induced electric current; the furnaces from 1 to 6 can be controlled to melt different parts of waste cars by burning fuel.

What the invention claimed is:

1. A waste car disposing system for collecting and categorizing waste products from waste cars passing therethrough, comprising:

(a) a plurality of furnaces adjacently mounted each to the other in open series relation, said furnaces including a first furnace having an operating temperature within the range of 280° C. –300° C., a second furnace having an operating temperature within the approximating range of 320° C. –330° C., a third furnace having an operating temperature within the range of 440° C. –450° C., a fourth furnace having an operating temperature within the range of 655° C. –665° C., a fifth furnace having an operating temperature within the range of 900° C. –1,000° C., a sixth furnace having an operating temperature within the approximating range of 1,000° C. –1,100° C., and a seventh furnace having an operating temperature within the range of 1,300° C. –1,600° C. for passage of waste cars consecutively through said first through said seventh furnace, said first to sixth furnaces being filled with nitrogen;

(b) a plurality of displaceable heat insulative gate members located between said adjacently mounted furnaces;

(c) drive means coupled to each of said heat insulative gate members for reversibly displacing each of said heat insulative member to (1) an open position and (2) a closed position;

(d) a conveyor extending through said first to seventh furnaces for carrying said waste cars through said plurality of furnaces, said conveyor being formed of an open gridwork construction;

(e) a plurality of individually controlled heating elements positioned in each of said furnaces for heating said waste cars;

(f) a plurality of side-loading collecting trays slidingly mounted beneath said conveyor within each of said furnaces for collection of melted compounds of said waste cars carried by said conveyor through each of said furnaces, each of said collecting trays being covered with a screen located below said conveyor;

(g) a plurality of pressure regulators respectively coupled to said first through said sixth furnaces for controlling the internal pressure of each of said furnaces; and, (h) a plurality of fuel injectors coupled to said seventh furnace for insert of fuel therein, said seventh furnace being coupled to a waste gas processing unit by an exhaust pipe, said waste gas processing unit including a rinse mechanism, a dust collector and a chimney.

\* \* \* \* \*